July 25, 1961

G. OBONI 2,993,384

FRICTION SPEED VARIATOR FOR MECHANICAL DRIVES, WITH
CONTINUOUSLY VARIABLE TRANSMISSION RATIO

Filed Oct. 9, 1959

INVENTOR.
GIUSEPPE OBONI
BY
Irvin S. Thompson
ATTY.

July 25, 1961  G. OBONI  2,993,384
FRICTION SPEED VARIATOR FOR MECHANICAL DRIVES, WITH
CONTINUOUSLY VARIABLE TRANSMISSION RATIO
Filed Oct. 9, 1959   4 Sheets-Sheet 2

INVENTOR.
GIUSEPPE OBONI
BY
Irwin S. Thompson
ATTY.

July 25, 1961
G. OBONI
2,993,384
FRICTION SPEED VARIATOR FOR MECHANICAL DRIVES, WITH
CONTINUOUSLY VARIABLE TRANSMISSION RATIO
Filed Oct. 9, 1959
4 Sheets-Sheet 3
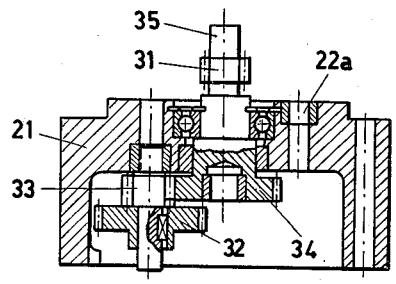
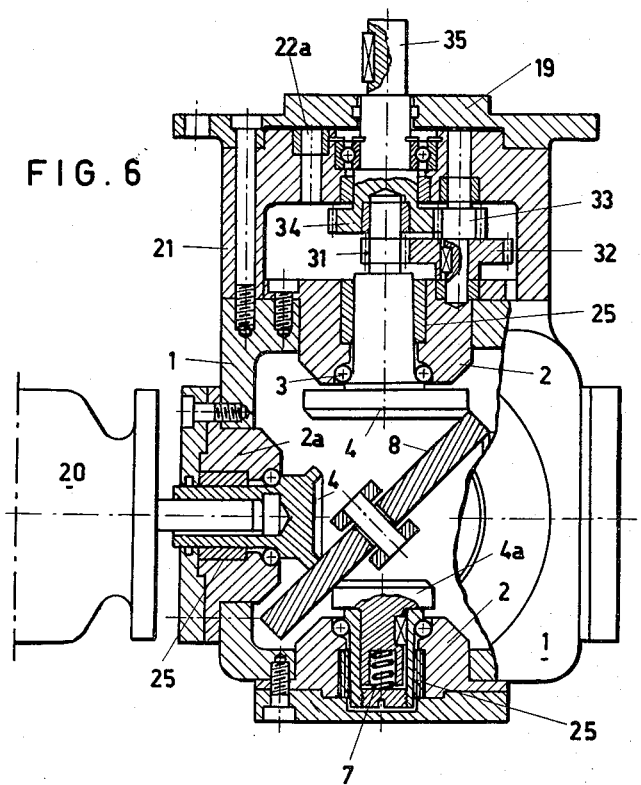
INVENTOR.
GIUSEPPE OBONI
BY
Irwin S. Thompson
ATTY.

July 25, 1961  G. OBONI  2,993,384
FRICTION SPEED VARIATOR FOR MECHANICAL DRIVES, WITH
CONTINUOUSLY VARIABLE TRANSMISSION RATIO
Filed Oct. 9, 1959  4 Sheets-Sheet 4
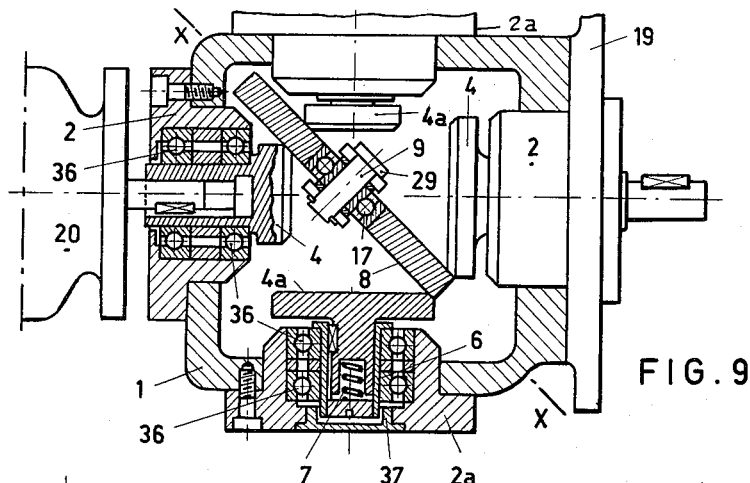
FIG. 9
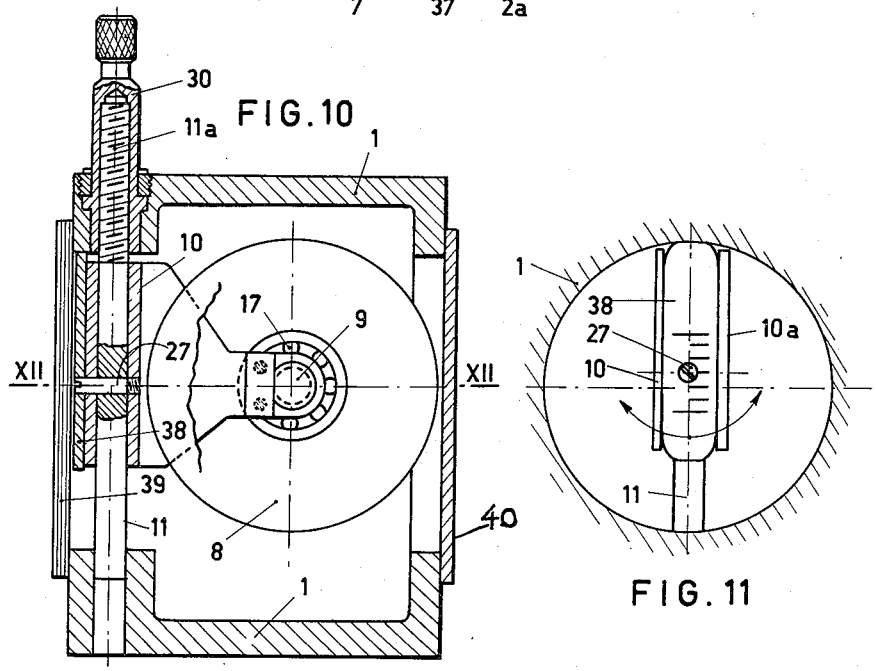
FIG. 10
FIG. 11
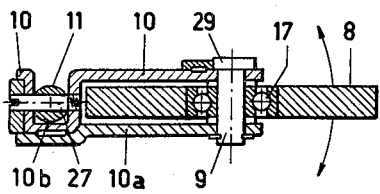
FIG. 12
INVENTOR.
GIUSEPPE OBONI
BY
Irvin S. Thompson
ATTY.

United States Patent Office 2,993,384
Patented July 25, 1961

2,993,384
FRICTION SPEED VARIATOR FOR MECHANICAL DRIVES, WITH CONTINUOUSLY VARIABLE TRANSMISSION RATIO
Giuseppe Oboni, 25 Via Manzoni, Turin, Piedmont, Italy
Filed Oct. 9, 1959, Ser. No. 845,546
Claims priority, application Italy Oct. 15, 1958
13 Claims. (Cl. 74—196)

It is known that many of the basic problems, not fully solved heretofore, of speed variators for mechanical drives, adapted to provide a continuous variation of the transmission ratio, are chiefly problems of space requirement as well as of production standardization and more particularly the need to provide a perfect adjustment of position of the members in mutual frictional contact with one another, in order to avoid slipping and efficiency losses due to imperfect contact.

This invention relates to a speed variator embodying new technical principles resulting in a satisfactory solution to the above problems and at the same time being of economical construction and lasting longer than the conventional devices.

The main mechanical concept on which the invention is based is the utilization of a disk disposed obliquely, in an adjustable position, between two pairs of transmission members, each of these pairs comprising two transmission wheels mounted on supports whose axes converge towards said disk, one of said transmission wheels being connected to the driving shaft, or to the driven shaft respectively, while the other provides for balancing the stresses and is mounted on an elastic support which urges it towards the disk by clamping the latter between the two transmission wheels of the pair. This arrangement requires a minimum of space, the variation of the transmission ratio remaining the same, and furthermore, by a suitable interchangeability of parts, it is possible to adapt the same variator in different configurations to various requirements of mutual position of the driving and driven shafts. The oscillating arrangement of the disk on its axis further affords an adjustment of the position of said disk between the two pairs of transmission wheels and therefore a perfect transmission of the drive. Further details and features of the variator according to the invention will be apparent from the following description with reference to the accompanying drawings which show a non-limiting example of the invention as well as some alternative embodiments thereof.

FIG. 6 shows a partial section, similar to FIG. 1, relating to an alternative embodiment and also illustrating the application of a reduction unit;

FIG. 7 shows in section a reduction unit adapted to co-operate with the variator according to the invention;

Figure 1:
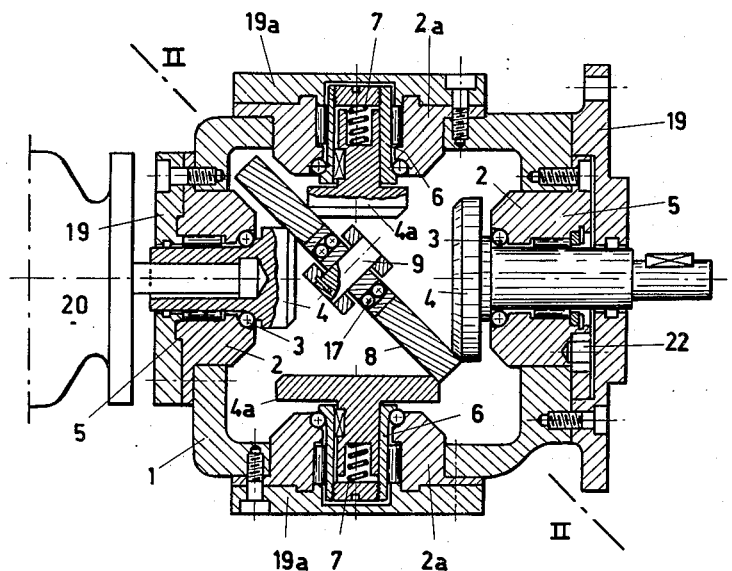
FIG. 1 shows, in cross section, a first embodiment of the variator according to the invention.
Figure 8:
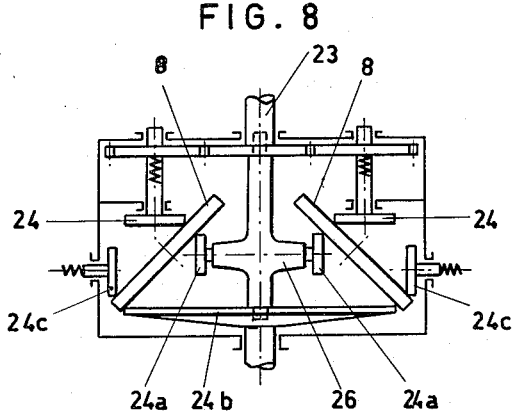
Figure 2A:
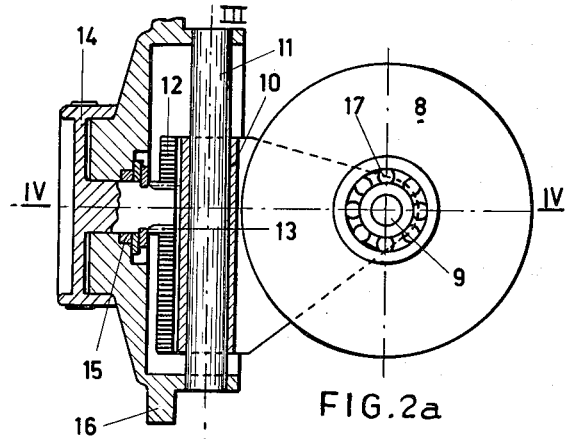
FIG. 2a shows the support and adjustment mechanism of the disk in section along the line II—II of FIG. 1.
Figure 2B:
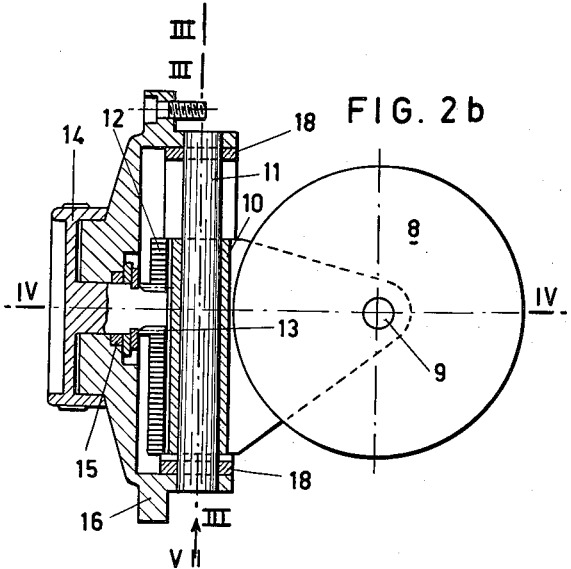
FIGS. 2b and 3b are similar to FIGS. 2a and 3a but relate to an alternative embodiment.
Figure 4:
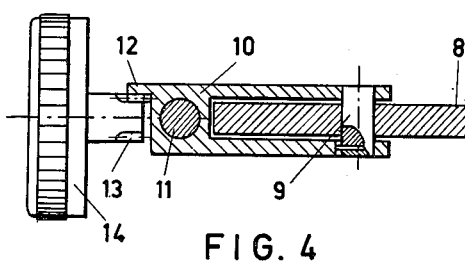
FIG. 4 shows a section along the line IV—IV of FIG. 2b.

FIG. 8 diagrammatically shows a further alternative embodiment;

FIG. 9 shows a cross section, similar to FIG. 1, of an improved variator;

FIG. 10 shows a section, similar to that of FIGS. 2a and 2b, taken along the line X—X of FIG. 9;

FIG. 11 shows a partial elevation of the variator as seen from the L.H. side according to FIG. 10, and FIG. 12 shows a section, similar to FIG. 4, taken along the line XII—XII of FIG. 10.

Figure 3A:
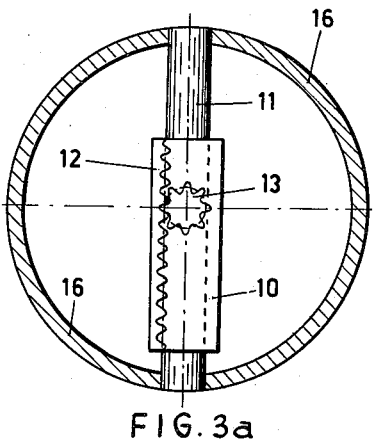
FIG. 3a shows a partial section along the line III—III of FIGS. 2a and 2b.
Figure 3B:
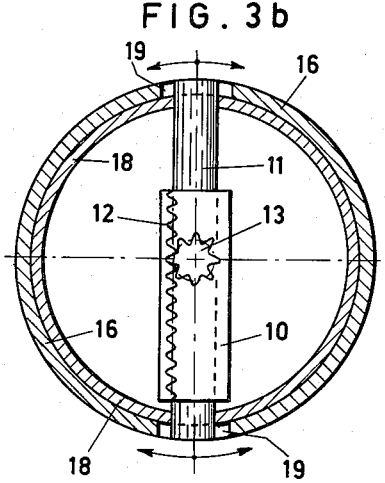
Figure 5:
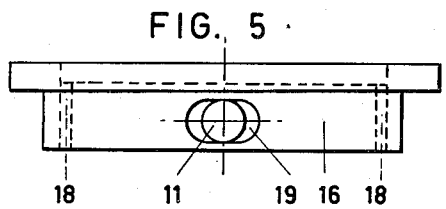
FIG. 5 shows a detail as seen in the direction of the arrow V of FIG. 2b.

The reference number 1 indicates the casing of the variator, constructed for instance of aluminum alloy or synthetic resin, which is provided with four windows for application of the bushings carrying the transmission wheels; these bushings is interchangeable at least in part, in order—as mentioned above—to dispose the driving and driven shafts in mutually different positions. The bushings 2 of the driving and driven shafts are each formed with a track for a set of balls or tapered rollers 3 which form a thrust bearing by rolling on a correspondingly machined surface of the active transmission wheels 4 (i.e. a driving and a driven wheel), and are further provided with a track for a set of small rollers 5 which bear the radial stresses transmitted by said transmission wheels; the bushings 2a of the other shafts—which are neither driving nor driven—are similarly equipped, but the rolling members co-operate with a bush 6 into which the corresponding passive transmission wheel can slide axially and is urged by a spring 7. The disk 8 is disposed obliquely and is clamped on all sides between the transmission wheels 4 and 4a forming a pair, the driving wheel 4 acting on one side of the disk 8 while the driven wheel 4a acts on the other side (relative to the revolution axis of disk 8) and on the same or on the opposite face of disk 8. Therefore, the transmission ratio will vary depending on the position of the axis of disk 8, which can be adjusted as required. To this purpose, the disk 8 is mounted on a shaft 9 carried by the stirrup-shaped arms of a carriage 10 slidable on a guide 11 and provided with a rack 12 meshing with a pinion 13 which can be operated from the outside by means of a knob 14 or other control member. A ring 15 of rubber or other resilient material prevents any penetration of dust or loss of oil and at the same time provides for braking the device to position the carriage 10 in order to avoid any spontaneous displacement. The whole assembly is supported by a cover 16 to which the guide 11 can be directly fastened (as seen in FIGS. 2a and 3a). In this case, freedom of oscillation of disk 8 is obtained by mounting the latter on shaft 9 by means of rolling and oscillating bearing 17. This mounting is particularly advantageous when the disk 8 is of steel or generally of metal. Said disk may be made instead of a wear-resistant synthetic resin (such as for instance Teflon or the like), and in this case it is preferable to mount the disk 8 directly rotatable on the shaft 9 (FIGS. 2b and 4). This being the case, the guide 11 must be pivotally mounted, and to this end it will be fastened to a ring 18 rotatable inside the cover 16, while the ends of said guide, by protruding into elongated windows 19 of the cover 16 (FIGS. 3b and 5), will limit the amplitude of oscillation of the guide. Disk 8 is allowed further limited degrees of freedom by the pivotal movement of carriage 10 on the guide 11, as well as by the axial play of disk 8 in the stirrup of carriage 10, whereby adjustment of the position of disk 8 is ensured in any case.

In the construction according to FIG. 1, wherein the bushings carry small-roller bearings 5, the bushings 2 are closed externally by covers 19 provided with a hole for passage of a shaft (driven or driving shaft), while the bushes 2a may be closed by means of bling covers 19a. The motor 20 and the drive take-up mechanism can be connected by flanges directly to the corresponding covers 19, or the transmission may take place through a rigid or flexible shaft, or through gears or pulleys or the like.

In designing the covers 19 and 19a it is advantageous to provide for bringing the shoulders, which form the guide flanks of the rollers 5, at the same level as that of the surfaces of contact with the underlying bushings, said surfaces being separated by a shallow centering recess. In this manner, these surfaces can be lapped with a single inexpensive operation.

Of course, the bushings 2 and 2a can be also of a type different from that shown in FIG. 1; for instance, in FIG. 6 there are shown bushings wherein the small rollers 5 are comprised of bushings 25 of antifriction material, such as bronze, white metal, a resin of the Teflon type, and the like.

The transmission wheels 4 and 4a may have the shape, as shown, of plates with active edge formed by a ground ring bevel gear; this active edge can be more or less extended, and it may also have the form of a rounded rim with a radius as small as to become an edge with a sharp corner; this will depend on the specific pressure desired in the frictional contact, which will vary inter alia as a function of the materials forming the members 4, 4a and the disk 8.

From FIG. 6 it will be apparent that the driven shaft, which in FIG. 1 lies in the direction of the driving shaft, can be disposed at right angles therewith by simply interchanging a bushing of the 4 type with a corresponding one of the 4a type. This allows adapting the same variator to different requirements of application. The casing 1 can be arranged—as shown in FIG. 6—for direct application thereon of a speed reducer whose casing 21 fulfils the purpose of the cover 19 corresponding to the driven shaft. In this case, the first wheel 31 of the speed reducer will be keyed directly to the variator driven shaft, while the second 32 and the third wheel 33 will be keyed to a shaft for which a bush 22 (FIG. 1) can be already predisposed in the body of the bushing 2 of the driven shaft in order to facilitate a possible application of the reducer. Finally, the fourth wheel 34 will be keyed to the reducer driven shaft 35, which protrudes from the casing 21 through the cover 19. The whole reduction unit is therefore mounted between the cover 19 and the bushing 2, against which said cover is directly applied in the absence of the reducer. Also in the body 21 of the reducer there can be arranged a bush 22a having a purpose like that of 22, namely to permit an easy cascade assembly of many reduction units like that of FIG. 7, so as to obtain the most suitable reduction ratios. Advantageously, the reduction ratio of a reductor stage will correspond to the variation of ratio obtainable with the variator, so that it will be always possible to obtain a desired ratio with a whole number of standardized reduction stages. Alternatively, different types of reductors having various ratios can be provided, which if suitably combined may give over-all ratios adapted to fulfil practically any requirement. A first reduction can take place already in the variator, due to a difference in the diameters of the transmission wheels of the driving pair and those of the driven pair, but in particular cases this first reduction may also not occur or be replaced by a overdrive, so that the sole variator (without reductor) may have its regulation field extended around the unitary transmission ratio in a symmetrical or non-symmetrical manner, or also extended entirely in the field of the speed reductions or of the overdrives.

The further alternative embodiment diagrammatically shown in FIG. 8 concerns a variator based on the same principle set forth above but adapted to the transmission of higher torques by providing two disks 8. In this instance, two active transmission wheels 24 are provided, which are driven by the driving shaft 23 through gears or the like. The passive transmission wheels 24a of the drive are carried by an intermediate support 26, while the driven transmission wheel 24b can be a single one, co-operating with the passive transmission wheels 24c. Two disks 8 transmit the drive from the pairs of driving transmission wheels to the driven ones, and these disks are inclined in opposite directions and their position is simultaneously and correspondingly adjusted.

In the reducer according to FIGS. 9 to 12, the bushings supporting the transmission wheels are provided with ball bearings 36 of standard type, also adapted to withstand axial stresses. Due to these axial stresses, being unilateral, the bearings can be mounted by simple slipping without clips, thereby rendering much simpler the machining of the bushings and the stems of the transmission members: moreover, by the adoption of standard bearings, the production costs will be materially reduced. Further, the bushings 2a of the passive transmission wheels are provided with threaded plugs 37 which, upon removal thereof from the bushing, will give access to the springs 7 and allow adjustment thereof without removing the bushings. This adjustment is thus rendered most easy and rapid, thereby permitting the attainment—in commercially economical conditions—of a more accurate calibration and a higher efficiency of the variator.

The carriage supporting the disk 8 comprises two stamped-plate parts, one of which 10a is nearly flat, while the other, 10 is formed with a deep groove 10b adapted to receive the carriage support spindle 11. These two parts 10a and 10 are welded to one another, e.g. spot-welded, in correspondence with the groove 10b, thereby forming a single body. To the part 10 is also welded a plate 29 which co-operates with spindle 9 preventing its revolution inside the carriage seats. Spindle 11 is slidably and axially mounted in the casing 1 of the variator, and is rendered integral with the carriage through a threaded pin 27 disposed radially relative to the disk 8. The carriage can perform a small oscillating movement about this pin 27 (in the direction of the arrows of FIG. 11) and further, together with the spindle 11, a small swinging movement about the axis of the latter (in the direction of the arrows of FIG. 12), so that the disk 8 can become adequately located between the transmission wheels which hold it in their grip. Therefore, disk 8 need not oscillate on its pin 9, and the bearing 17 can be of rigid construction.

The spindle 11 has a threaded end 11a on which is screwed a control knob 30 which is rotatable but is prevented from being displaced axially relative to the casing 1. By rotating this knob it is possible to micrometrically adjust the position of spindle 11 and therefore that of the carriage and the disk.

A sheet-metal plate 38, disposed between the edges of the sheets 10 and 10a forming the carriage, and held by the threaded pin 27, can be suitably graduated, and the graduation or scale may be visible from the outside through a transparent cover 39 of the casing 1; this plate also serves the purpose of adjusting the permissible stroke of carriage 10. In fact, its ends will limit the displacements of the carriage by bearing against the edges of the corresponding window of casing 1 on which the cover 39 is applied. By initially constructing this plate a little longer than required, it will be subsequently easy to bring it to the exact size by means of a trimming operation, in order to limit the carriage stroke while utilizing it to the utmost. Preferably, a further cover 40, opposite to 39, will permit access to the inside of the variator during this setup, in order to surely determine the extreme positions permissible to the carriage. Finally, it has been found that in some cases it is suitable to construct the disk 8 of a very hard material, particularly a material for tools of the type known as "ceramic."

The features described above can of course be applied wholly or partially, and variedly combined with one another as well with known or special peculiarities, in order to fulfill particular requirements. Accessories and complementary parts may be also added to what is described and illustrated herein and various changes and modification of constructive character may be made therein without departing from the invention, and it is, therefore, aimed to cover all such changes and modifications as fall within the true spirit and scope of the invention.

Having thus described my invention, what I claim and desire to protect by Letters Patent is:

1. A friction speed variator for mechanical drives comprising at least two pairs of transmission wheels, elastic pressure means acting on some of said transmission wheels, at least one freely rotatable disk disposed obliquely and clamped between the two transmission wheels of each of said pairs, and a support device for said disk, adapted to be displaced in a direction parallel to the plane of said disk, wherein the transmission wheels of each pair are mounted with their axes converging towards said disk, one transmission wheel of at least one pair being connected with a driving shaft and one transmission wheel of one different pair being connected with a driven shaft, while the remaining transmission wheels are urged towards said disk by said elastic pressure means, whereby the displacement of the support device for said disk will produce a gradual variation of the transmission ratio between said driving shaft and said driven shaft.

2. A friction speed variator as set forth in claim 1, wherein said support device for the disk comprises a carriage movably mounted on a guide and provided with a rack, and wherein the variator structure or casing carries a pinion meshing with said rack to produce displacement of said carriage, and an outer control member integral with said pinion and braked so as to prevent any undesired displacement of said carriage.

3. A friction speed variator as set forth in claim 1, wherein between said disk and said support device, or between said support device and the variator structure, there are provided means adapted to permit a limited oscillation of said disk, whereby said disk can spontaneously take a correct position between said transmission wheels.

4. A friction speed variator as set forth in claim 1, wherein said disk is made of a very hard material, particularly a material for tools of the so-called "ceramic" type.

5. A friction speed variator for mechanical drives, comprising two pairs of transmission wheels, one transmission wheel of the first pair being connected with a driving shaft and one transmission wheel of the second pair being connected with a driven shaft, elastic pressure means acting on the other two transmission wheels, a freely rotatable disk disposed obliquely and clamped between the two transmission wheels of each pair, said two wheels being disposed with their axes converging towards said disk, a support spindle carried by the variator structure, a carriage comprised of two stamped-plate parts joined together and forming a groove or channel which receives said support spindle, a connection pin which connects said carriage to said support spindle, said pin permitting a limited oscillation of said carriage, and a further pin integral with said said carriage and carrying said disk, whereby the displacement of said carriage along said support spindle will produce a gradual variation of the transmission ratio between said driving shaft and said driven shaft.

6. A friction speed variator as set forth in claim 5, wherein said support spindle has a threaded end and wherein the variator structure carries a control knob which is rotatable but is prevented from being displaced axially and is further provided with an inner screw thread, said threaded support spindle being screwed on said inner screw thread of said control knob, whereby rotation of said control knob will produce displacement of said disk and therefore a gradual variation of the transmission ratio.

7. A friction speed variator as set forth in claim 5, also comprising a plate integral with said pin connecting the carriage with the support spindle, the ends of said plate cooperating with the structure of the variator for limiting the stroke of said carriage, said plate being further calibrated and visible from the outside through a transparent cover of said variator casing so as to provide an indication of the obtained transmission ratio.

8. A friction speed variator for mechanical drives comprising two pairs of transmission wheels with convergent axes, elastic pressure means acting on some of said transmission wheels, a driving shaft and a driven shaft each connected with one of said transmission wheels, a disk disposed obliquely and clamped between the transmission wheels of each pair, a support device for said disk adapted to be displaced in a direction parallel to the plane of said disk, a bushing for each transmission wheel, and rolling means interposed between each transmission wheel and the corresponding bushing, said bushings being interchangeable with one another, so that by suitably displacing said bushings with the corresponding transmission wheels it is possible to obtain various mutual positions of said driving and driven shafts.

9. A friction speed variator as set forth in claim 8, wherein said transmission wheels not connected with the driving shaft nor with the driven shaft are mounted axially slidable into bushes provided in the rolling means of said bushings, said elastic pressure means acting between said transmission wheels and said bushes.

10. A friction speed variator as set forth in claim 8, wherein said transmission wheels not connected with the driving shaft nor with the driven shaft are mounted axially slidable into bushes provided in the rolling means of said bushings, said elastic pressure means being arranged at the inside of said bushings, each of said bushings being further provided with a threaded plug, so that removal of said plug will give access to said elastic means and permit adjustment thereof, if required.

11. A friction speed variator as set forth in claim 8, wherein said bushings comprise each a rear closing cover provided with a shoulder for abutment of said rolling means, said shoulder being disposed in the same plane as that of the contact surface between said bushing and said cover, whereby said surfaces can be machined in a single operation.

12. A friction speed variator for mechanical drives comprising two driving pairs of transmission wheels, one wheel of each of these pairs being connected with a single driving shaft, one driven transmission wheel connected with a driven shaft, two transmission wheels each coupled with said single driven wheel, elastic pressure means acting on the transmission wheels not connected with either the driving shaft or the driven shaft, two freely rotatable disks disposed obliquely and inclined in opposite directions, each of which is clamped between said driven wheel and one of the wheels coupled therewith, and between the two wheels of one of the two driving pairs, and two support devices for said two disks, adapted to be displaced correspondingly and each in a direction parallel to the plane of the disk associated therewith, whereby the transmission ratios between each of the driving pairs and the driven transmission wheels will be always the same and the displacement of said support devices will produce a gradual variation of the transmission ratio between said driving shaft and said driven shaft.

13. A friction speed variator as set forth in claim 1, comprising as an accessory a speed reducer whose structure is such that it can be applied directly on the variator casing and so as to receive the direct application of a further variator of similar construction.

No references cited.